United States Patent
Ma et al.

(10) Patent No.: US 9,218,482 B2
(45) Date of Patent: Dec. 22, 2015

(54) METHOD AND DEVICE FOR DETECTING PHISHING WEB PAGE

(71) Applicant: Huawei Technologies Co., Ltd., Shenzhen, Guangdong (CN)

(72) Inventors: Shaobu Ma, Beijing (CN); Hui Guo, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 248 days.

(21) Appl. No.: 13/689,230

(22) Filed: Nov. 29, 2012

(65) Prior Publication Data

US 2013/0086677 A1    Apr. 4, 2013

Related U.S. Application Data

(63) Continuation of application No. PCT/CN2011/083745, filed on Dec. 9, 2011.

(30) Foreign Application Priority Data

Dec. 31, 2010    (CN) .......................... 2010 1 0620647

(51) Int. Cl.
*G06F 21/50* (2013.01)
*G06F 17/30* (2006.01)
(Continued)

(52) U.S. Cl.
CPC ............ *G06F 21/50* (2013.01); *G06F 17/3089* (2013.01); *G06F 21/44* (2013.01);
(Continued)

(58) Field of Classification Search
USPC ............ 726/22, 2, 21, 36; 713/150, 163, 181; 380/255, 264, 276
See application file for complete search history.

(56) References Cited

U.S. PATENT DOCUMENTS

| 7,630,987 B1 | 12/2009 | Renfro et al. |
| 2006/0080735 A1* | 4/2006 | Brinson et al. .................. 726/22 |

FOREIGN PATENT DOCUMENTS

| CN | 1728655 A | 2/2006 |
| CN | 101145902 A | 3/2008 |

(Continued)

OTHER PUBLICATIONS $1^{st}$ Office Action in corresponding Chinese Patent Application No. 201010620647.6 (Jan. 16, 2013).
International Search Report in corresponding PCT Patent Application No. PCT/CN2011/083745 (Mar. 22, 2012).

*Primary Examiner* — Jason K. Gee
*Assistant Examiner* — Sharif E Ullah
(74) *Attorney, Agent, or Firm* — Leydig, Voit & Mayer, Ltd.

(57) ABSTRACT

The embodiments of the present invention provide a method and a device for detecting a phishing web page. The method includes: judging whether a unique domain name corresponding to a to-be-detected web page exists in a trusted domain name database; if the unique domain name does not exist in the trusted domain name database, determining a similarity between a content characteristic extracted from the to-be-detected web page and a content characteristic of each template file in a template file database; and determining that the to-be-detected web page is a phishing web page if the similarity between the content characteristic extracted from the to-be-detected web page and a content characteristic of at least one template file is greater than a preset similarity threshold. In the embodiments of the present invention, accuracy of a result of detecting a phishing web page is improved.

18 Claims, 6 Drawing Sheets

(51) Int. Cl.
*H04L 29/06* (2006.01)
*G06F 21/44* (2013.01)
*H04L 29/08* (2006.01)
*H04L 29/12* (2006.01)

(52) U.S. Cl.
CPC ............ *H04L63/1483* (2013.01); *H04L 67/02* (2013.01); *G06F 2221/2119* (2013.01); *H04L 61/1511* (2013.01)

(56) References Cited

FOREIGN PATENT DOCUMENTS

| | | |
|---|---|---|
| CN | 101510887 A | 8/2009 |
| CN | 101534306 A | 9/2009 |
| CN | 101826105 A | 9/2010 |
| CN | 102082792 A | 6/2011 |

* cited by examiner

METHOD AND DEVICE FOR DETECTING PHISHING WEB PAGE

CROSS-REFERENCE TO RELATED APPLICATIONS

This application is a continuation of International Patent Application No. PCT/CN2011/083745, filed on Dec. 9, 2011, which claims priority to Chinese Patent Application No. 201010620647.6, filed on Dec. 31, 2010, both of which are hereby incorporated by reference in their entireties.

FIELD OF THE INVENTION

The embodiments of the present invention relate to network technologies, and in particular, to a method and a device for detecting a phishing web page.

BACKGROUND OF THE INVENTION

A phishing website whistle-blowing mechanism is a basic solution to preventing a phishing website attack. The anti-phishing organization encourages a terminal user to submit found phishing information. The phishing information includes a uniform resource locator (URL for short), email content, and the like. Then, collected phishing information is processed discriminatively and organized into a repository which is in the form of a URL list, a unidirectional hash (Hash) value, and the like. The repository is deployed in various kinds of security devices or client software. When a foregoing device detects that the repository includes a currently accessed web page, the device intercepts and filters the web page to prevent an attack from a phishing web page.

Currently, a general method is to integrate a phishing detecting module into client software. When a user accesses a web page by using a browser, the phishing detecting module calculates suspiciousness of the web page according to a local or remote data query result, and sends alarm information to the user if the suspiciousness is high. A remote anti-phishing server provides functions such as data updating, querying and filtering for phishing detecting modules in many clients. The phishing detecting module performs detection mainly based on a known phishing URL list, a phishing IP address list, a trusted domain name list, a phishing keyword, general characteristics of many phishing web pages, and the like. General characteristics of many phishing web pages include: having a hypertext markup language (HTML) input label, having data compliant with a social insurance number, displaying a URL that is inconsistent with a real URL, and the like.

Because a URL, an IP address and a domain name of a phishing web page keep changing, many normal web pages also include a phishing keyword. Therefore, if a phishing web page is detected by using the foregoing method, a rate of identifying a phishing web page is relatively low, and a rate of misjudging a normal web page is relatively high. Therefore, detection accuracy of the method for detecting a phishing web page in the prior art is relatively low.

SUMMARY OF THE INVENTION

Embodiments of the present invention provide a method and a device for detecting a phishing web page, so as to improve accuracy of detecting a phishing website.

An embodiment of the present invention provides a method for detecting a phishing web page, where the method includes:

judging whether a unique domain name corresponding to a to-be-detected web page exists in a trusted domain name database;

if the unique domain name does not exist in the trusted domain name database, determining a similarity between a content characteristic extracted from the to-be-detected web page and a content characteristic of each template file in a template file database, where the content characteristic includes at least: a coding format, a document object model, a word, and the number of words; and determining that the to-be-detected web page is a phishing web page if a similarity between the content characteristic extracted from the to-be-detected web page and a content characteristic of at least one template file is greater than a preset similarity threshold.

An embodiment of the present invention provides a device for detecting a phishing web page, where the device includes:

a trusted domain name database, configured to store a unique domain name corresponding to a trusted web page;

a template file database, configured to store multiple template files, where the template files include a content characteristic extracted from a web page, and the content characteristic includes at least: a coding format, a document object model, a word, and the number of words of the web page;

a domain name determining module, configured to judge whether a unique domain name corresponding to a to-be-detected web page exists in the trusted domain name database;

a content extracting module, configured to extract a content characteristic from the to-be-detected web page if the unique domain name does not exist in the trusted domain name database;

a similarity determining module, configured to determine a similarity between the content characteristic extracted from the to-be-detected web page and a content characteristic of each template file in the template file database; and a phishing web page determining module, configured to determine that the to-be-detected web page is a phishing web page if a similarity between the content characteristic extracted from the to-be-detected web page and a content characteristic of at least one template file is greater than a preset similarity threshold.

In the embodiments of the present invention, after it is determined that a unique domain name of a to-be-detected web page is not a trusted domain name, a similarity between a content characteristic of the to-be-detected web page and a content characteristic of each template file in a template file database is determined, for example, content characteristics such as a coding format, a document object model, a word, and the number of words and the content characteristic of each template file in the template file database is determined, to determine whether the to-be-detected web page is a phishing web page. Therefore, in the present invention, whether a web page is a phishing web page is determined through a content characteristic, thereby improving accuracy of detecting a phishing web page. In addition, in the present invention, whether the to-be-detected web page is a trusted web page is determined first through a trusted domain name database that is updated continuously, thereby reducing a probability of misjudging a brand web page as a phishing web page.

BRIEF DESCRIPTION OF THE DRAWINGS

To illustrate the technical solutions in the embodiments of the present invention or in the prior art more clearly, the accompanying drawings required for describing the embodiments or the prior art are introduced briefly in the following.

Apparently, the accompanying drawings in the following description merely show some embodiments of the present invention, and persons of ordinary skill in the art may still derive other drawings from these accompanying drawings without creative efforts.

DETAILED DESCRIPTION OF THE EMBODIMENTS

To make the objectives, technical solutions, and advantages of the embodiments of the present invention more comprehensible, the technical solutions in the embodiments of the present invention are described clearly and completely in the following with reference to the accompanying drawings in the embodiments of the present invention. Apparently, the embodiments in the following description are merely a part rather than all of the embodiments of the present invention. All other embodiments obtained by persons of ordinary skill in the art based on the embodiments of the present invention without creative efforts shall fall within the protection scope of the present invention.

Figure 1:
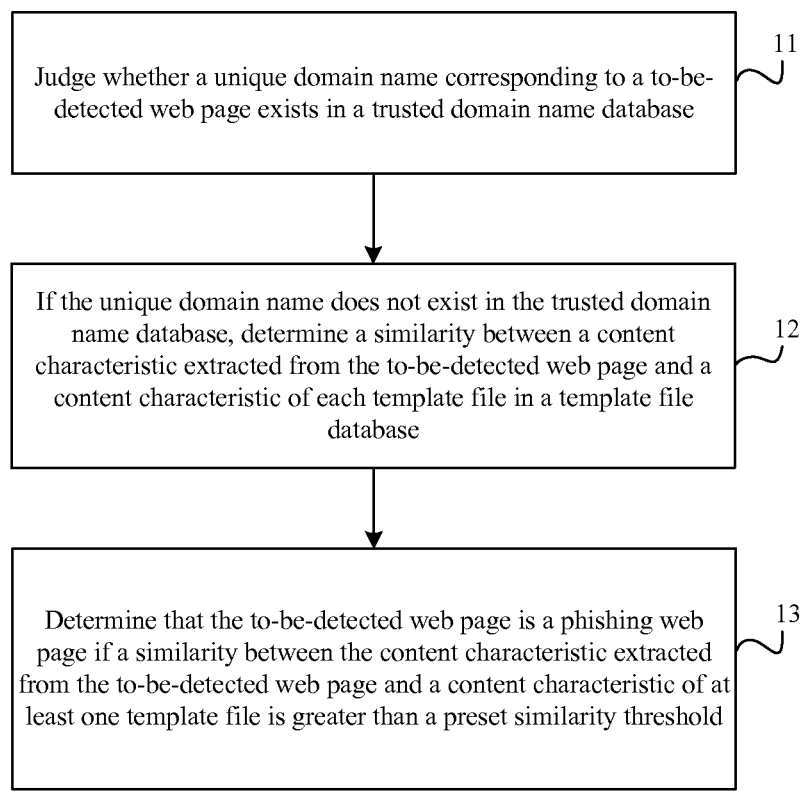
FIG. 1 is a flowchart of a method for detecting a phishing web page according to a first embodiment of the present invention.

FIG. 1 is a flowchart of a method for detecting a phishing web page according to a first embodiment of the present invention. As shown in FIG. 1, this embodiment includes:

Step 11: Judge whether a unique domain name corresponding to a to-be-detected web page exists in a trusted domain name database.

The to-be-detected web page in this embodiment may be obtained in many manners. One manner is that the to-be-detected web page is downloaded according to a URL and the downloaded to-be-detected web page is stored in a storage media; and another manner is that a data packet is extracted from network communication traffic directly. When the data packet is extracted from the network communication traffic directly, the data packet is further resolved to form an HTML file directly.

After the to-be-detected web page is obtained, a unique domain name is extracted from a URL that corresponds to the to-be-detected web page, and the unique domain name is searched in the trusted domain name database. If the unique domain name exists in the trusted domain name database, that is, if the unique domain name is a trusted domain name, the to-be-detected web page corresponding to the unique domain name is not a phishing web page. If the unique domain name does not exist in the trusted domain name database, the to-be-detected web page may be a phishing web page and may also not be a phishing web page, and a subsequent process of matching content characteristics needs to be performed to detect whether the to-be-detected web page is a phishing web page.

The trusted domain name database stores tens of thousands, millions, or even tens of millions of unique domain names of trusted web pages, which aims to, when phishing web page detection is performed, first use a unique domain name to exclude a brand web page or a web page that has never attacked by a phishing web page. The trusted domain name database needs to be updated periodically. Collection and extraction of domain names are primarily based on the following principles: Extract a URL from a collected URL list one by one; when a top-level domain name in a certain URL is a non-national top-level domain name, extract a second-level domain name from the URL and write it into the trusted domain name database; and if the top-level domain name in the URL is a national domain name and the second-level domain name is a top-level domain name string, extract a third-level domain name from the URL and write it into the trusted domain name database.

For example, if the top-level domain name in the URL is a non-national top-level domain name such as ".com", ".org", ".edu", ".net", ".gov", "int", "mil", "biz", "info", "pro", "name", and "idv", extract a second-level domain name in the URL. If the top-level domain name is a national or regional domain name, judge whether the second-level domain name is a common top-level domain name string such as "com", "org", "net", "gov", "edu", and "biz"; if yes, extract a third-level domain name; and otherwise, extract only the second-level domain name. An extracted domain name is as follows: huawei.com, huawei.com.cn, sina.com.cn, apwg.org, or apwg.net, and the like. After a domain name is extracted, convert the extracted domain name into a Hash table, and store the table for future query. A specific Hash algorithm for creating the Hash table may be a standard algorithm such as MD5, and SHA1, and may also be a user-defined algorithm.

Step 12: If the unique domain name does not exist in the trusted domain name database, determine a similarity between a content characteristic extracted from the to-be-detected web page and a content characteristic of each template file in a template file database.

The template file database may be a brand template database, and may also be a phishing template database. The template file database is configured to store a template file, where the template file includes a content characteristic extracted from a phishing web page or is configured to store a template file, where the template file includes a content characteristic extracted from a brand web page, and the content characteristic includes at least: a coding format, a document object model, a word, and the number of words, where the coding format, the document object model, the word, and the number of words are extracted from a web page.

If the unique domain name corresponding to the to-be-detected web page does not exist in the trusted domain name database, extract a content characteristic from the to-be-detected web page, and match the extracted content characteristic with a content characteristic stored in each template file in the phishing template database, or match the extracted content characteristic with a content characteristic stored in each template file in the brand template database; and determine a similarity between the content characteristic extracted from the to-be-detected web page and the content characteristic of each template file.

Many phishing websites generally use the same coding format, a similar word and a similar document object model (DOM for short) to generate a phishing web page by using an automatic program or fake a brand web page directly, and furthermore, the number of words is almost the same. Therefore, in this embodiment of the present invention, a similarity between the to-be-detected web page and a brand web page or a phishing web page can be determined by analyzing the content characteristic that includes a coding format, a document object model, a word, and the number of words.

The phishing template database includes multiple phishing template files used for storing a content characteristic extracted from each phishing web page. At the time of creating a phishing template database, content characteristics are extracted from multiple phishing web pages, and the content characteristic of each phishing web page is stored in the form of template file.

The brand template database includes multiple brand template files used for storing a content characteristic extracted from each brand web page. A brand web page is a web page that is frequently faked or a web page that tends to be faked, for example, web pages of major banks in the world, web pages of insurance companies, web pages of online payment organizations or enterprises, portal web pages of social intercourse websites, and on the like. At the time of creating a brand template database, content characteristics are extracted from multiple brand web pages, and the content characteristic of each brand web page is stored in the form of template file.

Step 13: Determine that the to-be-detected web page is a phishing web page if a similarity between the content characteristic extracted from the to-be-detected web page and a content characteristic of at least one template file is greater than a preset similarity threshold.

If a similarity between the content characteristic extracted from the to-be-detected web page and a content characteristic of one or more phishing template files in the phishing template database is greater than a preset similarity threshold, that is, if a phishing template file that is similar to the to-be-detected web page exists in the phishing template database, it is determined that the to-be-detected web page is a phishing web page that is not a fake brand web page. For example, the similarity may be a percentage value, and may also be another user-defined type. When the similarity is a percentage value, a higher percentage value means greater similarity. The similarity may also be a value ranging from 0 to 100, and in this case, a higher value means greater similarity. The preset similarity threshold may be an empiric value.

In addition, because each template file in the phishing template database corresponds to one phishing web page, a name of the phishing web page similar to the to-be-detected web page may further be determined when it is determined that the content characteristic in the to-be-detected web page is the same as a content characteristic of the phishing web page.

If a similarity between the content characteristic extracted from the to-be-detected web page and a content characteristic of one or more brand template files in the brand template database is greater than a preset similarity threshold, that is, if a brand template file that is similar to the to-be-detected web page exists in the brand template database, because the unique domain name corresponding to the to-be-detected web page is not a trusted domain name, it is determined that the to-be-detected web page is a phishing web page that is a fake brand web page.

In this embodiment, after it is determined that a unique domain name of a to-be-detected web page is not a trusted domain name, a similarity between a content characteristic of the to-be-detected web page and a content characteristic of each template file in a template file database is determined, to determine whether the to-be-detected web page is a phishing web page. A brand template file stores a content characteristic of a brand web page. In the case that the unique domain name of the to-be-detected web page is not a trusted domain name, if a similarity between the content characteristic of the to-be-detected web page and the content characteristic of the brand web page is high, it is determined that the to-be-detected web page is a phishing web page that is a fake brand web page. A template file stores a content characteristic of a phishing web page or a content characteristic of a brand web page. If a similarity between the content characteristic of the to-be-detected web page and a content characteristic of the template file is high, it is determined that the to-be-detected web page is a phishing web page that is not a fake brand web page. A phishing web page is usually generated by using an automatic program or by faking a brand web page directly, most of phishing web pages have similar content characteristics, and a content characteristic reflects a characteristic of a phishing web page. Therefore, in the present invention, whether a web page is a phishing web page is determined through a content characteristic, thereby improving accuracy of detecting a phishing web page. In addition, in the present invention, whether the to-be-detected web page is a trusted web page is determined first through a trusted domain name database that is updated continuously, thereby reducing a probability of misjudging a brand web page as a phishing web page.

Figure 2:
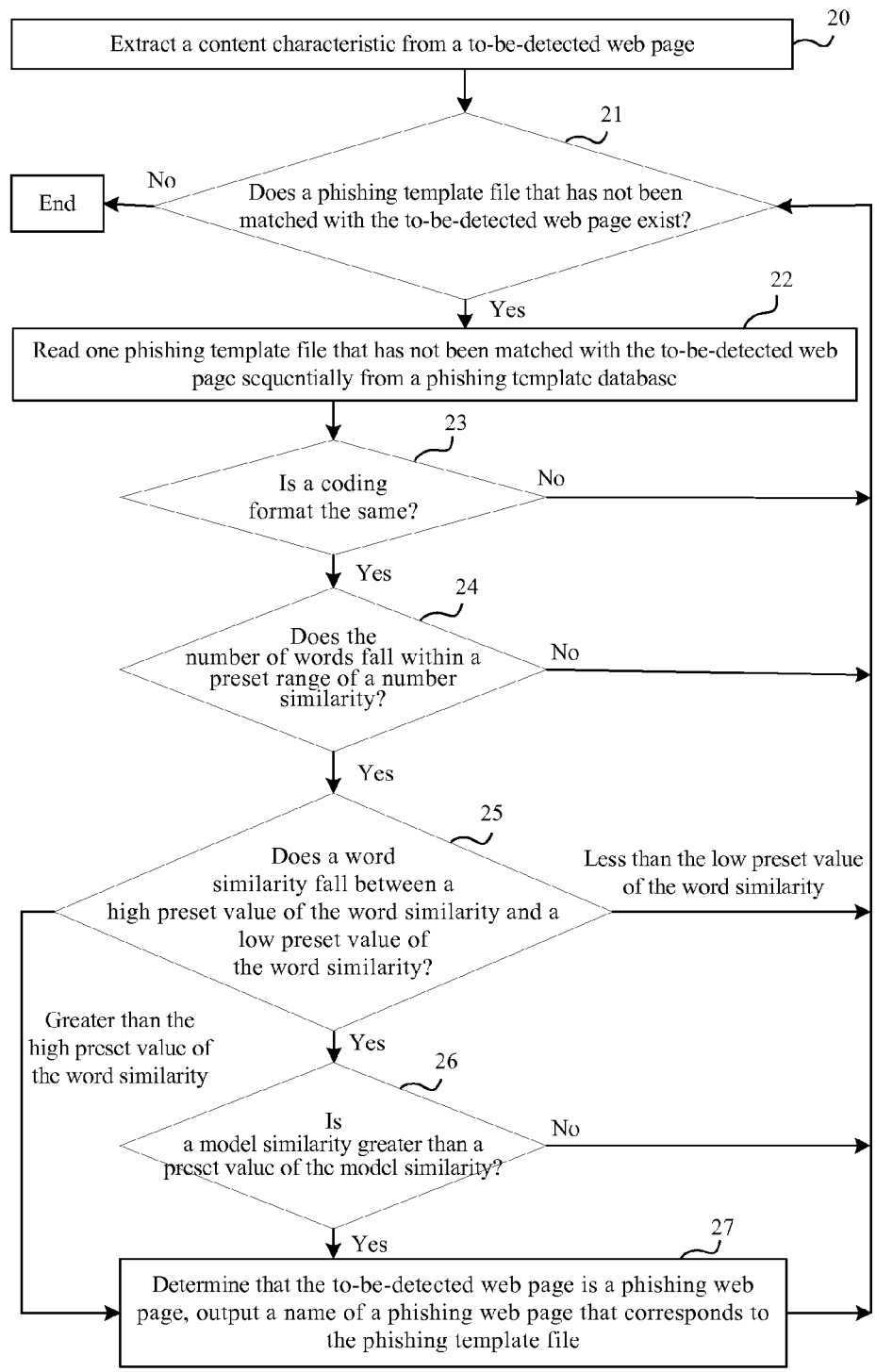
FIG. 2 is a flowchart of a method for detecting a phishing web page according to a second embodiment of the present invention.

FIG. 2 is a flowchart of a method for detecting a phishing web page according to a second embodiment of the present invention. In this embodiment, a method for matching a content characteristic of a to-be-detected web page with that of a phishing template file in a phishing template database is mainly described. As shown in FIG. 2, this embodiment includes:

Step 20: Extract a content characteristic from a to-be-detected web page.

Before step 20, a unique domain name of the to-be-detected web page is searched in a trusted domain name database first. Because the trusted domain name database stores a trusted unique domain name, if the unique domain name of the to-be-detected web page exists in the trusted domain name database, it is determined that the to-be-detected web page is a trusted web page. If the unique domain name of the to-be-detected web page does not exist in the trusted domain name database, step 20 is performed to judge, through a content characteristic of the to-be-detected web page, whether the to-be-detected web page is a phishing web page.

Step 21: Judge whether a phishing template file that has not been matched with the to-be-detected web page exists in a phishing template database; if yes, perform step 22; and otherwise, end the procedure.

If a brand template file in a brand template database is matched with the to-be-detected web page, step 21 may be: Judge whether a brand template file that has not been matched with the to-be-detected web page exists in the brand template database.

Step 22: Read one phishing template file that has not been matched with the to-be-detected web page sequentially from the phishing template database.

At the time of creating a phishing template database, to avoid that phishing template files with a similar content characteristic are stored in the phishing template database, after a content characteristic is extracted from a phishing web page, the content characteristic extracted from the phishing web page is matched with a content characteristic of each phishing template file in the phishing template database, and a similarity between the content characteristic extracted from the phishing web page and that of each phishing template file is determined. According to the similarity, it is determined whether to write the content characteristic in the form of a phishing template file into the phishing template database. If the similarity between the content characteristic extracted from the phishing web page and that of each phishing template file is less than a preset similarity threshold, the content characteristic extracted from the phishing web page is formed into a phishing template file, and the phishing template file is written into the phishing template database.

Similarly, at the time of creating a brand template database, to avoid that brand template files with a similar content characteristic are stored in the brand database, after a content characteristic is extracted from a brand web page, the content characteristic extracted from the brand web page is matched with a content characteristic of each brand template file in the brand template database, and a similarity between the content characteristic extracted from the brand web page and that of each brand template file is determined. According to the similarity, it is determined whether to write the content characteristic in the form of a brand template file into the brand template database. If the similarity between the content characteristic extracted from the brand web page and that of each brand template file is less than a preset similarity threshold, the content characteristic extracted from the brand web page is formed into a brand template file, and the brand template file is written into the brand template database.

Step 23: Judge whether a coding format of the to-be-detected web page is the same as a coding format in a current phishing template file; if the coding format of the to-be-detected web page is not the same as the coding format in the current phishing template file, go back to perform step 21; and if the coding format of the to-be-detected web page is the same as the coding format in the current phishing template file, perform step 24.

Step 24: If the coding format of the to-be-detected web page is the same as the coding format in the current phishing template file, judge whether an absolute value of a difference between the number of words extracted from the to-be-detected web page and the number of words in the current template file falls within a preset range of a number similarity. If the absolute value of the difference does not fall within the preset range of the number similarity, go back to perform step 21; and if the absolute value of the difference falls within the preset range of the number similarity, perform step 25.

If the absolute value of the difference between the number of words extracted from the to-be-detected web page and the number of words in the current phishing template file falls within the preset range of the number similarity, it indicates that the number of words extracted from the to-be-detected web page is close to the number of words in the current template file, and the to-be-detected web page is possibly a phishing web page, and further judgment needs to be performed to determine whether the to-be-detected web page is a phishing web page. According to the preset range of the number similarity, it may be determined that whether the number of words extracted from the to-be-detected web page and the number of words in the current phishing template file are in the same order of magnitude. If the difference between the two is great, it is considered that the to-be-detected web page is not similar to the current phishing template file. The preset range of the number similarity may be set according to the number of words in the to-be-detected web page.

Step 25: If the number of words extracted from the to-be-detected web page falls within the preset range of the number similarity, judge whether a word similarity between the words extracted from the to-be-detected web page and the words in the current phishing template file falls between a high preset value of the word similarity and a low preset value of the word similarity. If the word similarity falls between the high preset value of the word similarity and the low preset value of the word similarity, perform step 26. If the word similarity does not fall between the high preset value of the word similarity and the low preset value of the word similarity, but is greater than the high preset value of the word similarity, perform step 27; and if the word similarity is less than the low preset value of the word similarity, go back to perform step 21.

A word similarity is a measure about how many words in the to-be-detected web page are the same as those in a certain phishing template file. Generally, the word similarity may be expressed as a certain equation. For example, the to-be-detected web page has m words, a certain phishing template file has n words, and the two have s same words. In this case, the word similarity may be expressed as a percentage value: $[2 \times s/(m+n)] \times 100$. When the value is greater than a certain threshold, it is considered that the words in the to-be-detected web page are highly similar to the words in the certain phishing template file.

When the word similarity is greater than the high preset value of the word similarity, it indicates that many words in the to-be-detected web page are the same as the words in the phishing template file. Because a web page corresponding to the current phishing template file is a phishing web page, it may be determined that the to-be-detected web page is a phishing web page. If a web page corresponding to a current brand template file is a brand web page, because it has been determined, before the content characteristic of the to-be-detected web page is extracted, that the unique domain name of the to-be-detected web page does not exist in the trusted domain name database, it may also be determined that the to-be-detected web page is a phishing web page.

If the word similarity is less than the high preset value of the word similarity, it indicates that a few words in the to-be-detected web page are the same as the words in the template file, and it may be determined that the to-be-detected web page is not a phishing web page.

Step 26: If the word similarity falls between the high preset value of the word similarity and the low preset value of the word similarity, judge whether a model similarity between a document object model extracted from the to-be-detected web page and a document object model in the current phishing template file is greater than a preset value of the model similarity; if yes, perform step 27; and otherwise, go back to perform step 21.

If the similarity between the document object model extracted from the to-be-detected web page and the document object model in the current phishing template file is greater than the preset value of the model similarity, it indicates that a document object model similarity between the two is high. The model similarity may be converted into a percentage value, and may also be converted into a value ranging from 0 to 100. When the model similarity is converted into a percentage value, the preset value of the model similarity may be 80%. When the model similarity is converted into a value ranging from 0 to 100, the preset value of the model similarity may be 50.

Step 27: If the model similarity is greater than the preset value of the model similarity, determine that the to-be-detected web page is a phishing web page, and output a name of the phishing web page that corresponds to the phishing template file. Go back to perform step 21.

After the to-be-detected web page is determined as a phishing web page, matching with a subsequent template file is further performed in order to find, according to the model similarity, a most similar template file among multiple template files whose model similarity reaches the preset value of the model similarity, and then output a name of a phishing web page that corresponds to the most similar template file.

If the file read in step 22 is a brand template file in the brand template database, in step 27, a name of a brand web page that corresponds to the brand template file is output.

It should be noted that a phishing template may include only a part of content characteristics among a coding format, the number of words, a word similarity, and a document object model similarity, and the foregoing content characteristics may be combined flexibly, and the order of judging a similarity may also be adjusted flexibly. For example:

Alternative Solution 1:

Omit step 23; and after step 22, that is, after reading one phishing template file that has not been matched with the to-be-detected web page sequentially from the phishing template database, is performed, proceed to step 24 directly, that is, judge whether an absolute value of a difference between the number of words extracted from the to-be-detected web page and the number of words in the current template file falls within a preset range of a number similarity. If the absolute value of the difference does not fall within the preset range of the number similarity, go back to perform step 21; and if the absolute value of the difference falls within the preset range of the number similarity, perform step 25.

Alternative Solution 2:

Perform steps 24 to 25 first, in which the number of words and the word similarity are determined; and if whether the to-be-detected web page is a phishing web page cannot be judged according to the number of words and the word similarity, perform step 23, that is, judge a coding format, and if the coding format of the to-be-detected web page is the same as the coding format in the current phishing template file, the to-be-detected web page is a phishing web page, and otherwise, the to-be-detected web page is a non-phishing web page.

Other various alternative solutions are not enumerated here exhaustively.

In this embodiment of the present invention, content characteristics such as a coding format, a word, the number of words, and a DOM are extracted from a to-be-detected web page; an extracted content characteristic is matched with a content characteristic stored in each phishing template file in a phishing template database; if the coding format is the same as that of a currently matched phishing template file, it is determined that the to-be-detected web page is a phishing web page, and the extracted content characteristic is further matched with a next phishing template file; if the coding format is different, the number of words extracted from the to-be-detected web page is matched with the number of words in a current phishing template file; if the number of words extracted from the to-be-detected web page is close to the number of words in the current phishing template file, it is determined that the to-be-detected web page is a phishing web page; and otherwise, a word similarity between the to-be-detected web page and the phishing template file is further matched; if the word similarity reaches a preset value of the word similarity, it is determined that the to-be-detected web page is a phishing web page, and the extracted content characteristic is further matched with a next phishing template file; and otherwise, model similarity matching is performed between the DOM of the to-be-detected web page and a DOM of the phishing template file; if a model similarity reaches a preset value of the model similarity, it is determined that the to-be-detected web page is a phishing web page; and when it is determined that the to-be-detected web page is a phishing web page, a name of a web page corresponding to a currently matched phishing template file is output. In addition, a content characteristic of the to-be-detected web page may also be matched with each template file in a brand template database. When it is determined that the to-be-detected web page is a phishing web page, a name of a web page corresponding to the template file may be output, that is, a name of a brand web page that is faked by the to-be-detected web page.

Figure 3:
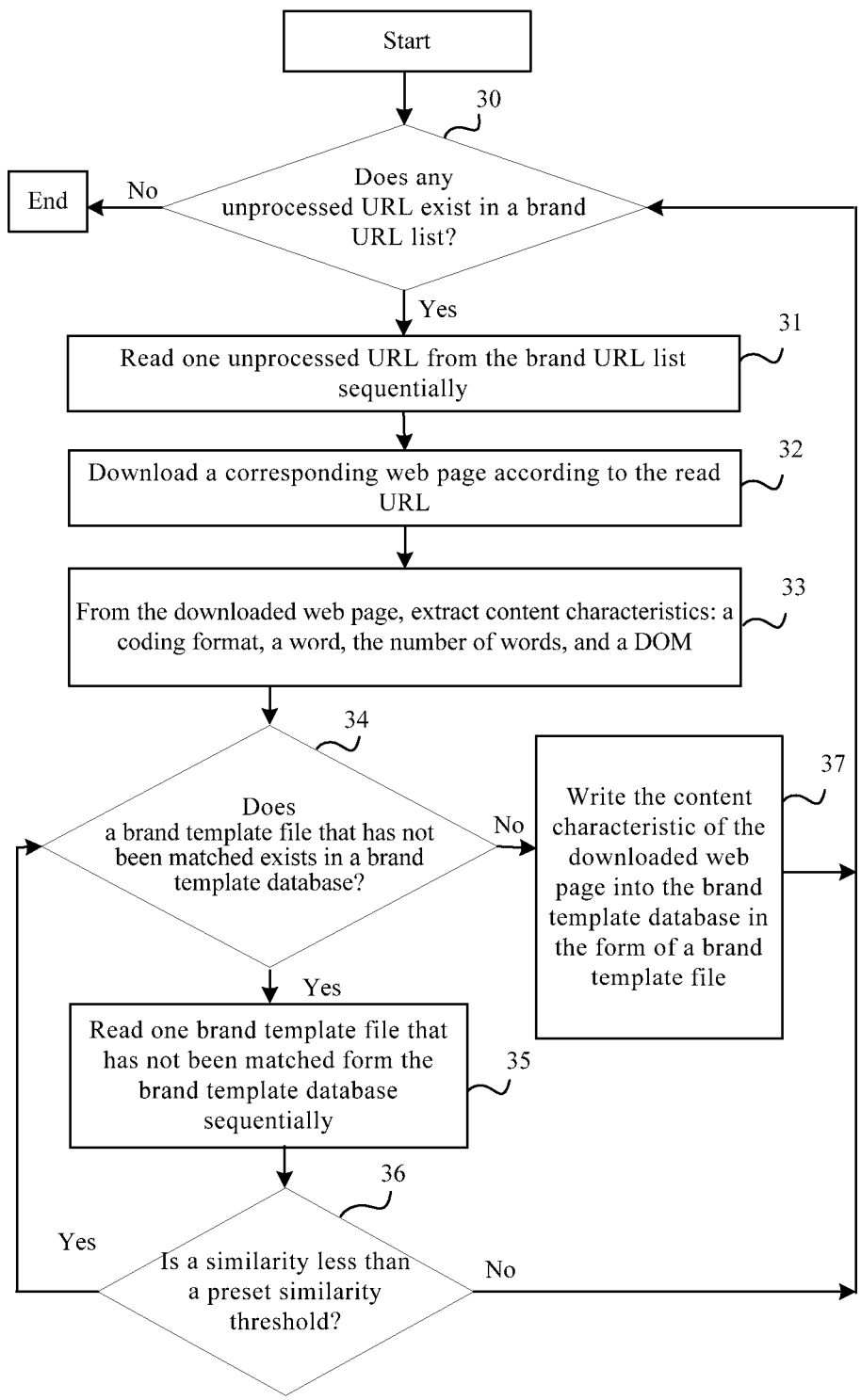
FIG. 3 is a flowchart of a method for detecting a phishing web page according to a third embodiment of the present invention.

FIG. 3 is a flowchart of a method for detecting a phishing web page according to a third embodiment of the present invention. In this embodiment, a process of creating a brand template file in a brand template database is mainly described. A process of creating a phishing template file in a phishing template database is similar to that of creating a brand template database. The only difference is that the phishing template file in the phishing template database is used to store a content characteristic of a known phishing web page, but the brand template file in the brand template database is used to store a content characteristic of a known brand web page. As shown in FIG. 3, this embodiment includes:

Step 30: Judge whether any unprocessed URL exists in a brand URL list; if yes, perform step 31; and otherwise, end the procedure.

Step 31: Read one unprocessed URL from the brand URL list sequentially.

Step 32: Download a corresponding web page according to the read URL.

Step 33: From the downloaded web page, extract content characteristics: a coding format, a word, the number of words, and a DOM of the downloaded web page.

Step 34: Judge whether a brand template file that has not been matched exists in a brand template database. Specifically, judge whether a brand template file that has not been matched with a content characteristic extracted from the downloaded web page exists in the brand template database. If a brand template file that has not been matched with the content characteristic extracted from the downloaded web page exists, perform step 35; and otherwise, perform step 37.

Step 35: Read one brand template file that has not been matched from the brand template database sequentially.

Step 36: Judge whether a similarity between the content characteristic of the downloaded web page and a content characteristic of a current brand template file is less than a preset similarity threshold. If the similarity is less than the preset similarity threshold, determine that the downloaded web page is not similar to the current brand template file, and go back to perform step 34 to further perform matching with a subsequent brand template file. If the similarity is greater than the preset similarity threshold, determine that the downloaded web page is similar to the current brand template file and the content characteristic of the downloaded web page does not need to be stored in the brand template database, and go back to perform step 30 to perform matching with a downloaded web page that corresponds to a next URL.

Step 37: Write the content characteristic of the downloaded web page into the brand template database in the form of a brand template file; and go back to perform step 30 continually.

In this embodiment of the present invention, at the time of creating a brand template database, a content characteristic of a downloaded web page is matched with that of an existing brand template file in a brand template database, and the downloaded web page is stored in the brand template database in the form of a brand template file only when no brand template file that is similar to the downloaded web page exists in the brand template database (that is, the downloaded web page is not similar to all brand template files), thereby avoiding repeatedly storing brand template files of multiple similar web pages in the brand template database.

Figure 4A:
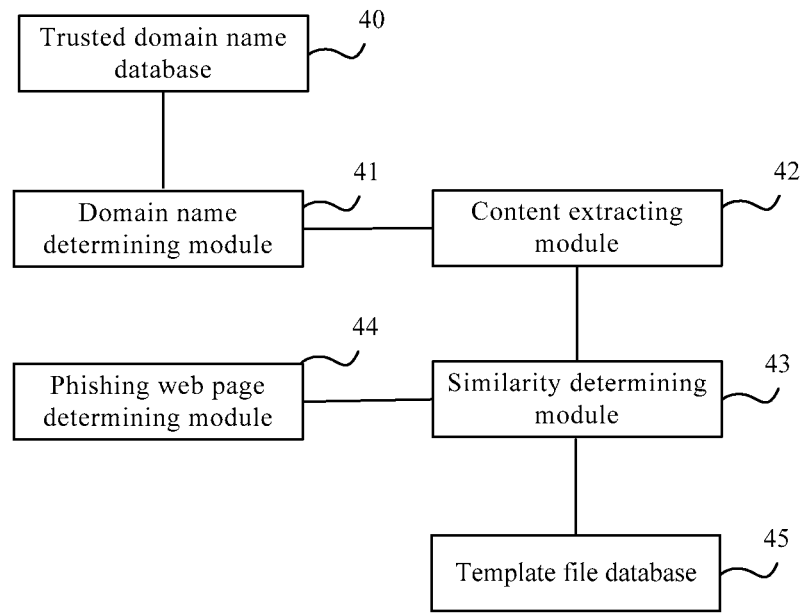
FIG. 4A is a schematic structural diagram of a device for detecting a phishing web page according to the first embodiment of the present invention.

FIG. 4A is a schematic structural diagram of a device for detecting a phishing web page according to the first embodiment of the present invention. As shown in FIG. 4, this embodiment includes: a trusted domain name database 40, a domain name determining module 41, a content extracting module 42, a similarity determining module 43, a phishing web page determining module 44, and a template file database 45.

The trusted domain name database 40 is configured to store a trusted unique domain name. The template file database 45 is configured to store multiple template files, where the template files include a content characteristic extracted from a web page, and the content characteristic includes at least: a coding format, a document object model, a word, and the number of words of the web page. Specifically, the template file database includes: a phishing template database and a brand template database. The phishing template database is configured to store a template file that includes a content characteristic extracted from a phishing web page. The brand template database is configured to store a template file that includes a content characteristic extracted from a brand web page.

The domain name determining module 41 is configured to judge whether a unique domain name corresponding to a to-be-detected web page exists in the trusted domain name database 40. The content extracting module 42 is configured to extract a content characteristic from the to-be-detected web page if the domain name determining module 41 determines that the unique domain name does not exist in the trusted domain name database.

The similarity determining module 43 is configured to determine a similarity between the content characteristic extracted by the content extracting module 42 from the to-be-detected web page and a content characteristic of each template file in the template file database 45.

The phishing web page determining module 44 is configured to determine that the to-be-detected web page is a phishing web page if a similarity between the content characteristic extracted from the to-be-detected web page and a content characteristic of at least one template file is greater than a preset similarity threshold.

Figure 4B:
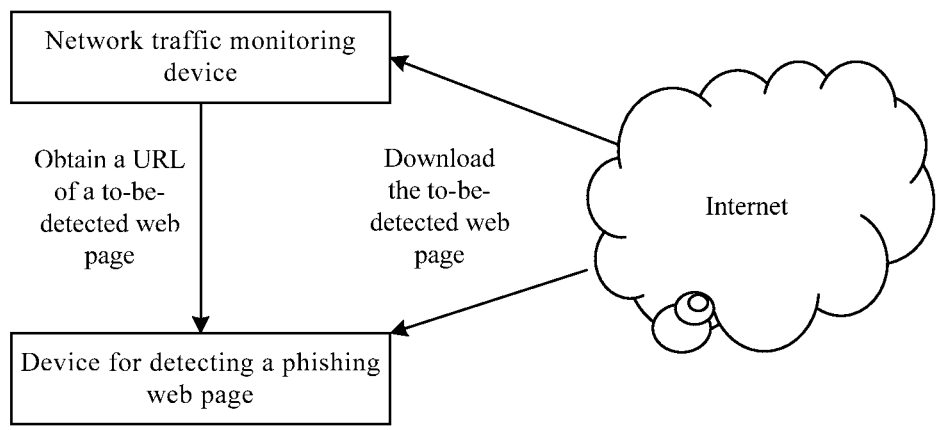
FIG. 4B is a schematic diagram of an application scenario of a device for detecting a phishing web page according to an embodiment of the present invention.
Figure 4C:
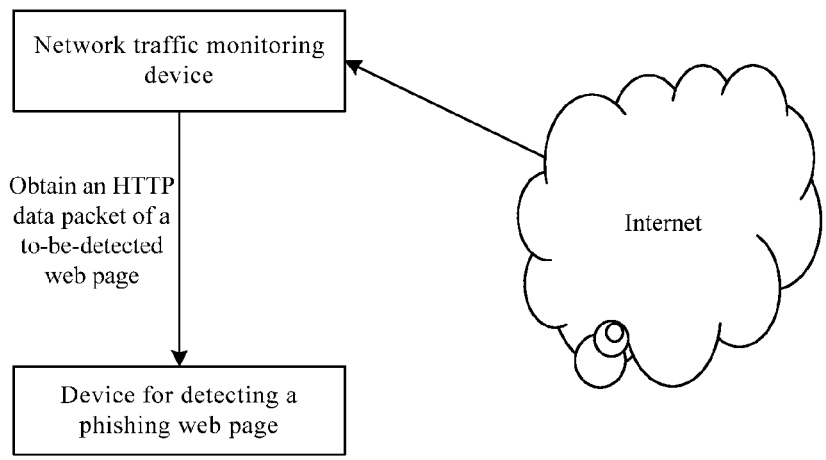
FIG. 4C is a schematic diagram of another application scenario of a device for detecting a phishing web page according to an embodiment of the present invention.

The device for detecting a phishing web page in this embodiment of the present invention detects a web page without collaboration of a remote device, and can be deployed at any network node, and supports large-traffic detection. For example, the device may be deployed on a network traffic monitoring device, a firewall device, a router, and so on. FIG. 4B is a schematic diagram of an application scenario of a device for detecting a phishing web page according to an embodiment of the present invention. As shown in FIG. 4B, in this embodiment of the present invention, the device for detecting a phishing web page obtains a URL of a to-be-detected web page from a network traffic monitoring device, downloads the to-be-detected web page from a network according to the URL, detects the to-be-detected web page, and outputs a detection result to another device. FIG. 4C is a schematic diagram of another application scenario of a device for detecting a phishing web page according to an embodiment of the present invention. As shown in FIG. 4C, in this embodiment of the present invention, the device for detecting a phishing web page obtains an HTTP data packet from a network traffic monitoring device directly to detect a phishing web page, and outputs a detection result to another device.

Figure 5:
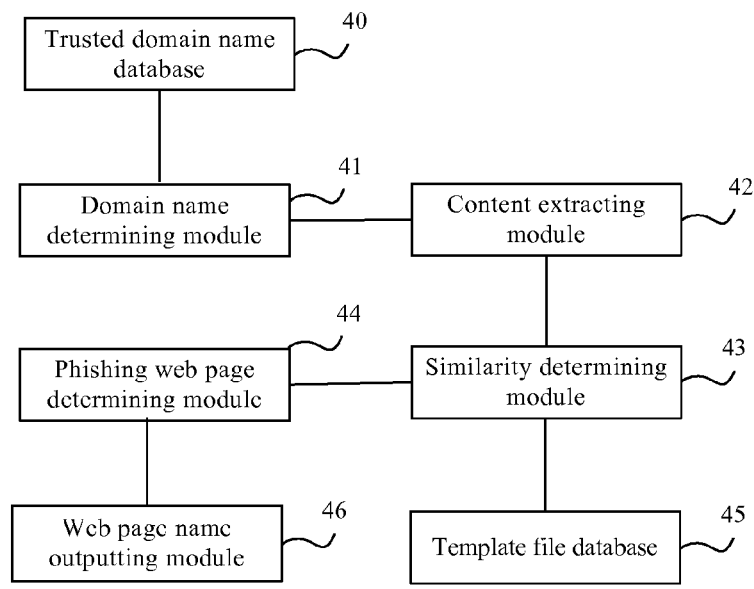
FIG. 5 is a schematic structural diagram of a device for detecting a phishing web page according to the second embodiment of the present invention.

Moreover, as shown in FIG. 5, this embodiment further includes: a web page name outputting module 46, configured to determine a template file, a similarity between which and a content characteristic extracted from a to-be-detected web page is greater than a preset similarity threshold, and output a name of a phishing web page that corresponds to the template file or a name of a faked brand web page that corresponds to the template file.

For working principles of the foregoing modules, reference is made to the description about the embodiment illustrated in FIG. 1, which are not detailed any further.

By using the device for detecting a phishing web page in this embodiment of the present invention, at the time of detecting a to-be-detected web page, the domain name determining module 41 searches a locally stored trusted domain name database for a unique domain name that corresponds to the to-be-detected web page. If the unique domain name does not exist in the trusted domain name database, the similarity determining module 43 matches a content characteristic of the to-be-detected web page with that of a locally stored template file to determine a similarity. A phishing web page is usually generated by using an automatic program or by faking a brand web page directly, phishing web pages have similar content characteristics, and a content characteristic may reflect a characteristic of a phishing web page. Therefore, in the present invention, whether a web page is a phishing web page is determined through a content characteristic, thereby improving accuracy of detecting a phishing web page. In addition, in the present invention, whether the to-be-detected web page is a trusted web page is determined first through a trusted domain name database that is updated continuously, thereby reducing a probability of misjudging a brand web page as a phishing web page.

Figure 6:
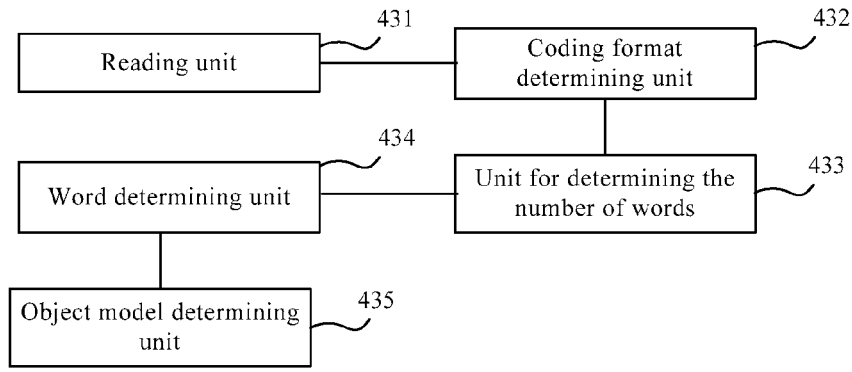
FIG. 6 is a schematic structural diagram of a similarity determining module shown in FIG. 4 or FIG. 5.

FIG. 6 is a schematic structural diagram of a similarity determining module shown in FIG. 4 or FIG. 5. As shown in FIG. 6, the similarity determining module 43 includes: a reading unit 431, a coding format determining unit 432, a unit for determining the number of words 433, a word determining unit 434, and an object model determining unit 435.

The reading unit 431 is configured to read a template file from a phishing template database or a brand template database.

The coding format determining unit 432 is configured to judge whether a coding format extracted from a to-be-detected web page is the same as a coding format in the template file.

The unit for determining the number of words 433, configured to: if the coding format determining unit 432 determines that the coding format extracted from the to-be-detected web page is the same as the coding format in the template file, judge whether the number of words extracted from the to-be-detected web page falls within a preset range of a number similarity corresponding to the number of words in the template file.

The word determining unit 434 is configured to: if the unit for determining the number of words 433 determines that the number of words falls within the preset range of the number similarity, judge whether a word similarity between the words extracted from the to-be-detected web page and the words in the template file falls between a high preset value of the word similarity and a low preset value of the word similarity.

The object model determining unit 435 is configured to: if the word determining unit 434 determines that the word similarity falls between the high preset value of the word similarity and the low preset value of the word similarity, determine a model similarity between a document object model extracted from the to-be-detected web page and a document object model in the template file, and judge whether the model similarity is greater than a preset value of the model similarity.

The phishing web page determining module 44 is specifically configured to determine that the to-be-detected web page is a phishing web page if the object model determining unit 435 determines that the model similarity is greater than the preset value of the model similarity or the word determining unit 434 determines that the word similarity is higher than the high preset value of the word similarity.

For working principles of the foregoing modules, reference is made to the description about the embodiment illustrated in FIG. 2, which are not detailed any further.

In this embodiment of the present invention, content characteristics such as a coding format, a word, the number of words, and a DOM of a web page are extracted from a to-be-detected web page; an extracted content characteristic is matched with a content characteristic stored in each phishing template file in a phishing template database to obtain multiple similarities; if one of the similarities is greater than a preset similarity threshold, it is determined that the to-be-detected web page is a phishing web page; and it may further determine a name of a web page that corresponds to a template file whose similarity is greater than the preset similarity threshold, and then determine a phishing web page that is similar to the to-be-detected web page. In addition, a content characteristic of the to-be-detected web page may further be matched with that of each template file in a brand template database. If it is determined that a similarity of a template file in the brand template database is greater than the preset similarity threshold, it is determined that the to-be-detected web page is a phishing web page, and at the same time, may output a name of a web page that corresponds to the template file, that is, a name of a brand web page that is faked by the to-be-detected web page.

Figure 7:
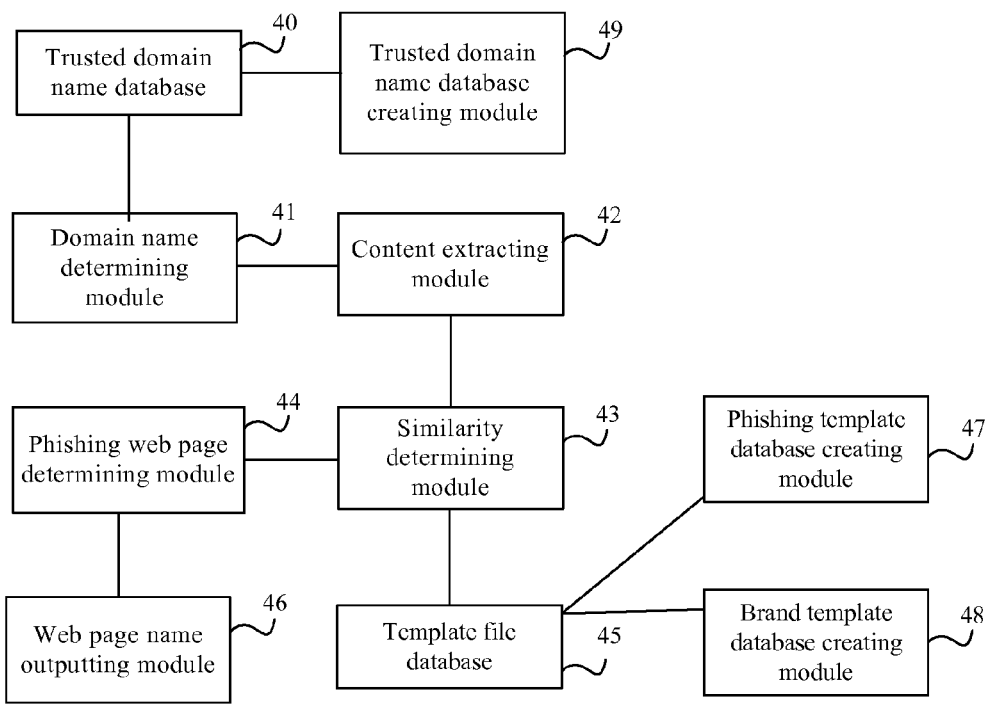
FIG. 7 is a schematic structural diagram of a device for detecting a phishing web page according to the third embodiment of the present invention.

FIG. 7 is a schematic structural diagram of a device for detecting a phishing web page according to a third embodiment of the present invention. As shown in FIG. 7, on the basis of the embodiment illustrated in FIG. 5, a phishing template database creating module 47, a brand template database creating module 48, and a trusted domain name database creating module 49 are further included.

The phishing template database creating module 47 is configured to: match a content characteristic extracted from a phishing web page with a content characteristic of each template file in a phishing template database, and determine a similarity between the content characteristic extracted from the phishing web page and that of each template file; and if the similarity between the content characteristic extracted from the phishing web page and that of each template file is less than a preset similarity threshold, form the content characteristic extracted from the phishing web page into a template file, and write the template file into the phishing template database.

The brand template database creating module 48 is configured to: match a content characteristic extracted from a brand web page with a content characteristic of each template file in a brand template database, and determine a similarity between the content characteristic extracted from the brand web page and that of each template file; and if the similarity between the content characteristic extracted from the brand web page and that of each template file is less than a preset similarity threshold, form the content characteristic extracted from the brand web page into a template file, and write the template file into the brand template database.

The trusted domain name database creating module 49 is configured to: if a top-level domain name in a URL is a non-national top-level domain name, extract a second-level domain name from the URL and write it into a trusted domain name database; and if the top-level domain name in the URL is a national domain name and the second-level domain name is a top-level domain name string, extract a third-level domain name from the URL and write it into the trusted domain name database.

For working principles of the foregoing modules, reference is made to the description about the embodiment illustrated in FIG. 3, which are not detailed any further.

In this embodiment of the present invention, at the time of creating a brand template database, a content characteristic of a downloaded web page is matched with an existing template file in a brand template database, and the downloaded web page is stored in the brand template database in the form of a template file only when no template file whose content characteristic is similar to the content characteristic of the downloaded web page exists in the brand template database, thereby avoiding repeatedly storing template files of multiple similar web pages in the brand template database.

Persons of ordinary skill in the art may understand that all or part of the steps of the method embodiments may be implemented by a program instructing relevant hardware. The program may be stored in a computer readable storage medium. When the program runs, the steps of the method embodiments are performed. The storage medium includes any medium capable of storing program codes, such as a ROM, a RAM, a magnetic disk, or an optical disk.

Finally, it should be noted that the foregoing embodiments are only intended for describing the technical solutions of the present invention rather than limiting the present invention. Although the present invention is described in detail with reference to the foregoing embodiments, persons of ordinary skill in the art should understand that they can still make modifications to the technical solutions described in the foregoing embodiments or make equivalent substitutions to some technical features in the technical solutions, as long as these modifications or substitutions do not cause the essence of corresponding technical solutions to depart from the spirit and scope of the technical solutions in the embodiments of the present invention.

What is claimed is:

1. A method for detecting a phishing web page, comprising:
   judging whether a unique domain name corresponding to a to-be-detected web page exists in a trusted domain name database;
   when the unique domain name does not exist in the trusted domain name database, determining a similarity between a content characteristic extracted from the to-be-detected web page and a content characteristic of each template file in a template file database comprising a phishing template database or a brand template database, wherein the content characteristic comprises at least: a coding format, a document object model, a word, and a number of words; and
   determining that the to-be-detected web page is the phishing web page when the similarity between the content characteristic extracted from the to-be-detected web page and a content characteristic of at least one template file is greater than a preset similarity threshold;
   wherein determining that the to-be-detected web page is the phishing web page further comprises the following:

(a) reading a template file from the template file database, and judging whether a coding format extracted from the to-be-detected web page is the same as a coding format in the template file;
(b) when the coding format extracted from the to-be-detected web page is the same as the coding format in the template file, judging whether an absolute value of a difference between the number of words extracted from the to-be-detected web page and the number of words in the template file falls within a preset range of a number similarity;
(c) when the number of words falls within the preset range of the number similarity, determining whether a word similarity between the words extracted from the to-be-detected web page and the words in the template file falls between a high preset value of the word similarity and a low preset value of the word similarity;
(d) when the word similarity falls between the high preset value of the word similarity and the low preset value of the word similarity, calculating a model similarity between a document object model extracted from the to-be-detected web page and a document object model in the template file; and
(e) when the model similarity is greater than a preset value of the model similarity or the word similarity is higher than the high preset value of the word similarity, determining that the to-be-detected web page is the phishing web page; reading a next template file from the phishing template database or the brand template database, and repeating the above steps of (a) to (d) until a most similar template file is found according to the model similarity among multiple template files whose model similarity reaches the preset value of the model similarity;
wherein (b) is performed after (a), (c) is performed after (b), (d) is performed after (c) and (e) is performed after (d).

2. The method for detecting a phishing web page according to claim 1, wherein:
the trusted domain name database is configured to store a trusted unique domain name of the to-be-detected web page, a template file in the phishing template database comprises a content characteristic extracted from the phishing web page, and a template file in the brand template database comprises a content characteristic extracted from a brand web page.

3. The method for detecting a phishing web page according to claim 1, wherein:
after the determining that the to-be-detected web page is the phishing web page, the method further comprises:
when determining a template file, a similarity between which and the content characteristic extracted from the to-be-detected web page is greater than the preset similarity threshold, outputting a name of the phishing web page that corresponds to the template file or a name of a faked brand web page that corresponds to the template file.

4. The method for detecting a phishing web page according to claim 1, wherein before the judging whether the unique domain name corresponding to the to-be-detected web page exists in the trusted domain name database, the method further comprises:
matching a content characteristic extracted from the phishing web page with a content characteristic of each template file in a phishing template database, and determining a similarity between the content characteristic extracted from the phishing web page and that of each template file; and
when the similarity between the content characteristic extracted from the phishing web page and that of each template file is less than the preset similarity threshold, forming the content characteristic extracted from the phishing web page into a first template file, and writing the first template file into the phishing template database.

5. The method for detecting a phishing web page according to claim 1, wherein before the judging whether the unique domain name corresponding to the to-be-detected web page exists in the trusted domain name database, the method further comprises:
matching a content characteristic extracted from a brand web page with a content characteristic of each template file in a brand template database, and determining a similarity between the content characteristic extracted from the brand web page and that of each template file; and
when the similarity between the content characteristic extracted from the brand web page and that of each template file is less than the preset similarity threshold forming the content characteristic extracted from the brand web page into a first template file, and writing the first template file into the brand template database.

6. The method for detecting a phishing web page according to claim 4, wherein before the judging whether the unique domain name corresponding to the to-be-detected web page exists in the trusted domain name database, the method further comprises:
when a top-level domain name in a collected uniform resource locator is a non-national top-level domain name, extracting a second-level domain name from the uniform resource locator and writing the second-level domain into the trusted domain name database; and
when the top-level domain name in the uniform resource locator is a national domain name and the second-level domain name is a top-level domain name string, extracting a third-level domain name from the uniform resource locator and writing the third-level domain name into the trusted domain name database.

7. The method for detecting a phishing web page according to claim 5, wherein before the judging whether the unique domain name corresponding to the to-be-detected web page exists in the trusted domain name database, the method further comprises:
when a top-level domain name in a collected uniform resource locator is a non-national top-level domain name, extracting a second-level domain name from the uniform resource locator and writing it into the trusted domain name database; and
when the top-level domain name in the uniform resource locator is a national domain name and the second-level domain name is a top-level domain name string, extracting a third-level domain name from the uniform resource locator and writing the third-level domain name into the trusted domain name database.

8. A device for detecting a phishing web page, comprising a memory and a processor coupled to the memory, wherein:
the memory includes a trusted domain name database and a template file database,
wherein the trusted domain name database is configured to store a unique domain name that corresponds to a trusted web page;
wherein the template file database comprising a phishing template database or a brand template database, is configured to store multiple template files, wherein the multiple template files comprise a content characteristic extracted from a web page, and the content characteristic comprises at least: a coding format, a document object model, a word, and a number of words;

the processor is configured to judge whether a unique domain name corresponding to a to-be-detected web page exists in the trusted domain name database;

the processor is configured to extract a content characteristic from the to-be-detected web page when the unique domain name does not exist in the trusted domain name database;

the processor is configured to determine a similarity between the content characteristic extracted from the to-be-detected web page and a content characteristic of each template file in the template file database; and the processor is configured to determine that the to-be-detected web page is the phishing web page when a similarity between the content characteristic extracted from the to-be-detected web page and a content characteristic of at least one template file is greater than a preset similarity threshold;

wherein when determining the similarity between the content characteristic extracted from the to-be-detected web page and the content characteristic of each template file in the template file database, the processor is further configured to:

(a) read a template file from the phishing template database or the brand template database;

(b) judge whether a coding format extracted from the to-be-detected web page is the same as a coding format in the template file;

(c) when the coding format extracted from the to-be-detected web page is the same as the coding format in the template file, judge whether an absolute value of a difference between the number of words extracted from the to-be-detected web page and the number of words in the template file falls within a preset range of a number similarity; and (d) when the absolute value of the difference between the number of words extracted from the to-be-detected web page and the number of words in the template file falls within the preset range of the number similarity, judge whether a word similarity between the words extracted from the to-be-detected web page and the words in the template file falls between a high preset value of the word similarity and a low preset value of the word similarity; and (e) when the word similarity falls between the high preset value of the word similarity and the low preset value of the word similarity, determine a model similarity between a document object model extracted from the to-be-detected web page and a document object model in the template file, and judge whether the model similarity is greater than a preset value of the model similarity;

wherein (b) is performed after (a), (c) is performed after (b), (d) is performed after (c) and (e) is performed after (d).

9. The device for detecting a phishing web page according to claim 8, the processor is further configured to:

determine a template file, a similarity between which and the content characteristic extracted from the to-be-detected web page is greater than the preset similarity threshold, and output a name of the phishing web page that corresponds to the template file or a name of a faked brand web page that corresponds to the template file.

10. The device for detecting a phishing web page according to claim 9, wherein the processor is further configured to determine that the to-be-detected web page is a phishing web page when the model similarity is greater than the preset value of the model similarity or the word similarity is higher than the high preset value of the word similarity.

11. The device for detecting a phishing web page according to claim 10, wherein the template file database comprises:

a phishing template database, configured to store a template file that comprises a content characteristic extracted from the phishing web page; and a brand template database, configured to store a template file that comprises a content characteristic extracted from a brand web page.

12. The device for detecting a phishing web page according to claim 11, the processor is further configured to:

match the content characteristic extracted from the phishing web page with a content characteristic of each template file in the phishing template database, and determine a similarity between the content characteristic extracted from the phishing web page and that of each template file; and when the similarity between the content characteristic extracted from the phishing web page and that of each template file is less than the preset similarity threshold, form the content characteristic extracted from the phishing web page into a first template file, and write the first template file into the phishing template database; and match the content characteristic extracted from the brand web page with a content characteristic of each template file in the brand template database, and determine a similarity between the content characteristic extracted from the brand web page and that of each template file; and when the similarity between the content characteristic extracted from the brand web page and that of each template file is less than the preset similarity threshold, form the content characteristic extracted from the brand web page into a second template file, and write the second template file into the brand template database.

13. The device for detecting a phishing web page according to claim 12, the processor is further configured to:

when a top-level domain name in a collected uniform resource locator is a non-national top-level domain name, extract a second-level domain name from the uniform resource locator and write the second-level domain name into the trusted domain name database; and when the top-level domain name in the collected uniform resource locator is a national domain name and the second-level domain name is a top-level domain name string, extract a third-level domain name from the uniform resource locator and write the third-level domain name into the trusted domain name database.

14. A method for detecting a phishing web page, comprising:

judging whether a unique domain name corresponding to a to-be-detected web page exists in a trusted domain name database;

when the unique domain name does not exist in the trusted domain name database, determining a similarity between a content characteristic extracted from the to-be-detected web page and a content characteristic of each template file in a template file database comprising a phishing template database or a brand template database, wherein the content characteristic comprises at least: a word, a number of words, and a document object model; and determining that the to-be-detected web page is a phishing web page when the similarity between the content characteristic extracted from the to-be-detected web page and a content characteristic of at least one template file is greater than a preset similarity threshold;

wherein determining that the to-be-detected web page is the phishing web page further comprises the following:

(a) reading a template file from the template file database, and judging whether an absolute value of a difference between the number of words extracted from the to-be-detected web page and the number of words in the template file falls within a preset range of a number similarity;

(b) when the number of words falls within the preset range of the number similarity, determining whether a word similarity between the words extracted from the to-be-detected web page and the words in the template file falls between a high preset value of the word similarity and a low preset value of the word similarity;

(c) when the word similarity falls between the high preset value of the word similarity and the low preset value of the word similarity, calculating a model similarity between a document object model extracted from the to-be-detected web page and a document object model in the template file; and (d) when the model similarity is greater than a preset value of the model similarity or the word similarity is higher than the high preset value of the word similarity, determining that the to-be-detected web page is the phishing web page; and reading a next template file from the phishing template database or the brand template database, and repeating the above steps of (a) to (c) until a most similar template file is found according to the model similarity among multiple template files whose model similarity reaches the preset value of the model similarity;

wherein (b) is performed after (a), (c) is performed after (b), and (d) is performed after (c).

15. The method for detecting a phishing web page according to claim 14, wherein:

the trusted domain name database is configured to store a trusted unique domain name of the to-be-detected web page, the template file database is a brand template database or a phishing template database, a template file in the phishing template database comprises a content characteristic extracted from the phishing web page, and a template file in the brand template database comprises a content characteristic extracted from a brand web page.

16. The method for detecting a phishing web page according to claim 14, wherein after the determining that the to-be-detected web page is the phishing web page, the method further comprises:

when determining a template file, a similarity between which and the content characteristic extracted from the to-be-detected web page is greater than the preset similarity threshold, outputting a name of the phishing web page that corresponds to the template file or a name of a faked brand web page that corresponds to the template file.

17. The method for detecting a phishing web page according to claim 14, wherein before the judging whether the unique domain name corresponding to the to-be-detected web page exists in the trusted domain name database, the method further comprises:

matching a content characteristic extracted from the phishing web page with a content characteristic of each template file in a phishing template database, and determining a similarity between the content characteristic extracted from the phishing web page and that of each template file; and when the similarity between the content characteristic extracted from the phishing web page and that of each template file is less than the preset similarity threshold, forming the content characteristic extracted from the phishing web page into a first template file, and writing the first template file into the phishing template database.

18. The method for detecting a phishing web page according to claim 14, wherein before the judging whether a unique domain name corresponding to a to-be-detected web page exists in a trusted domain name database, the method further comprises:

matching a content characteristic extracted from a brand web page with a content characteristic of each template file in a brand template database, and determining a similarity between the content characteristic extracted from the brand web page and that of each template file; and when the similarity between the content characteristic extracted from the brand web page and that of each template file is less than the preset value of the model similarity, forming the content characteristic extracted from the brand web page into a first template file, and writing the first template file into the brand template database.

* * * * *